US009135457B1

(12) United States Patent  
Arnaudov (10) Patent No.: US 9,135,457 B1  
(45) Date of Patent: Sep. 15, 2015

(54) SYSTEM AND METHOD FOR RECORDING AND APPLYING ACCESS PRIVILEGES IN A VIRTUALIZED ENVIRONMENT

(75) Inventor: Antoan Yankov Arnaudov, Sofia (BG)

(73) Assignee: VMware, Inc., Palo Alto, CA (US)

(*) Notice: Subject to any disclaimer, the term of this patent is extended or adjusted under 35 U.S.C. 154(b) by 237 days.

(21) Appl. No.: 13/430,893

(22) Filed: Mar. 27, 2012

(51) Int. Cl.
```
G06F 7/04       (2006.01)
G06F 15/16      (2006.01)
G06F 17/30      (2006.01)
H04L 29/06      (2006.01)
G06F 21/60      (2013.01)
```

(52) U.S. Cl.
CPC ................................ G06F 21/604 (2013.01)

(58) Field of Classification Search
CPC ............................ H04L 63/102; G06F 21/604
USPC .......................................................... 726/1–26
See application file for complete search history.

(56) References Cited

U.S. PATENT DOCUMENTS

| | | | | |
|---|---|---|---|---|
| 2003/0089675 | A1* | 5/2003 | Koestler ..................... | 213/201 |
| 2010/0050252 | A1* | 2/2010 | King et al. ................. | 726/21 |
| 2010/0071035 | A1* | 3/2010 | Budko et al. ............... | 726/4 |
| 2011/0131572 | A1* | 6/2011 | Elyashev et al. ........... | 718/1 |
| 2013/0226970 | A1* | 8/2013 | Weber et al. ............... | 707/785 |

OTHER PUBLICATIONS

Oh et al, Task-role-based access control model, Sep. 2003, Elsevier Science Ltd, Journal Information Systems, vol. 28 Issue 6, pp. 533-562.*
VMware, vSphere Basic System Administration, https://www.vmware.com/pdf/vsphere4/r40/vsp_40_admin_guide.pdf.*
U.S. Appl. No. 13/041,150, filed Mar. 4, 2011, entitled "Task-Based Access Control in a Virtualization Environment."

* cited by examiner

*Primary Examiner* — Andrew Nalven  
*Assistant Examiner* — Khang Do (57) ABSTRACT

A technique for determining which permissions are required to perform certain administrative tasks efficiently records the required permissions between record and stop signals. An administrator presses a record button on a graphical user interface (GUI) and subsequently enters commands to perform the administrative tasks. After the last command is entered, the administrator presses a stop button on the GUI. Commands need not actually execute between the record and stop signals, but rather permissions for each command need to be recorded by an administration application, which is able to organize sets of permissions as roles. When a given user is associated with a particular role, the user is assigned all permissions for the role. Using this technique, the administrator may delegate administrative tasks to the user without the inefficiencies of conventional trial and error methods.

16 Claims, 6 Drawing Sheets

SYSTEM AND METHOD FOR RECORDING AND APPLYING ACCESS PRIVILEGES IN A VIRTUALIZED ENVIRONMENT

BACKGROUND

Enterprise computing environments employ increasing numbers of computer systems, network systems, and storage systems to satisfy growing computational and storage capacity requirements. A given computing environment typically hosts multiple applications, each requiring customization and certain types of isolation from other applications. To accommodate this customization and isolation, the systems implement a permissions regime that requires each user to be granted a specific permission to perform a specific corresponding action. For example, a computer system may require a user to have permission to execute programs, and a storage system may require a user to have permission to access a specific storage volume or a certain portion of the storage volume, such as a user directory. The storage system may also specifically require read, write, and execute permission for related operations within the storage volume.

As typical computing environments grow to comprise thousands of systems, managing detailed permissions associated with each system within the computing environment grows increasingly complex and challenging. Administrators are faced with a growing inventory of systems and increasing complexity required to manage each system. A staff of multiple users is typically employed to manage this growing complexity. One or more of the users may be associated with a predefined "role" that defines specific permissions that enable a user to perform related actions. Being associated with the predefined role has the effect of granting a user permission to perform their assigned administrative tasks within the computing environment.

Virtualized computing environments provide tremendous efficiency and flexibility to systems operators by enabling the computing, storage, and networking resources within the computing environment to be deployed as needed to accommodate specific applications or specific capacity requirements. For example, multiple virtual machines (VMs) may be created and operated on physical computer systems based on demand for new computation resources. Similarly, virtual storage may be allocated and assigned to specified applications as needed. Corresponding permissions for each virtualization management task are conventionally required. For example, permission is typically required to create a new VM, turn on or off a VM, allocate virtual storage, associate storage with a VM, and so forth. While virtualized computing and storage increases efficiency, virtualization also increases administrative complexity by introducing yet more different permissions.

One significant administrative challenge in enterprise computing environments is managing a large and growing collection of different permissions required to perform a growing set of administrative tasks. To properly grant a sufficient set of permissions to a particular role, an administrator typically adds incremental permissions to the role using an iterative, ad hoc process. This process involves the user testing the role to determine whether all necessary permissions have been granted for each administrative task, and asking the administrator for additional permissions when errors are encountered. Because no additional permissions should be granted to a role beyond those absolutely necessary to perform specific administrative tasks, this process typically involves incrementally finding and adding permissions to the role until a user is able to perform all administrative tasks using the role. This process is time consuming and inefficient. Therefore, what is needed in the art is a more efficient technique for determining which permissions should be associated with a given role in a computation environment.

SUMMARY

One or more embodiments of the present invention provide techniques for setting permissions that are required to perform administrative tasks in a computing system having a plurality of managed objects. The managed objects may be virtual machines instantiated in the computing system, and the administrative tasks may include powering on virtual machines, powering off virtual machines, migrating virtual machines, cloning virtual machines, and creating virtual machine snapshots. With these techniques, an administrator can delegate specific administrative tasks to designated users without conventional trial and error inefficiencies associated with determining a complete set of permissions required to perform the administrative tasks In one embodiment, the method includes the steps of receiving a command corresponding to an administrative task targeting at least one managed object within the computing system, programmatically determining a set of permissions required to perform the command in response to receiving the command, saving the set of required permissions to a role that can be associated with any user to enable the user to perform the administrative task at a later time, and associating the saved set of required permissions with the role. In another embodiment, the method includes the steps of receiving a start signal for initiating a recording of the permissions required to perform an administrative task targeting at least one managed object within the computing system, programmatically determining a set of permissions required to perform the administrative task, receiving a stop signal for stopping the recording, saving the set of required permissions that have been programmatically determined between initiation and stopping of the recording, and associating the saved set of required permissions with a user to enable the user to perform the administrative task at a later time.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
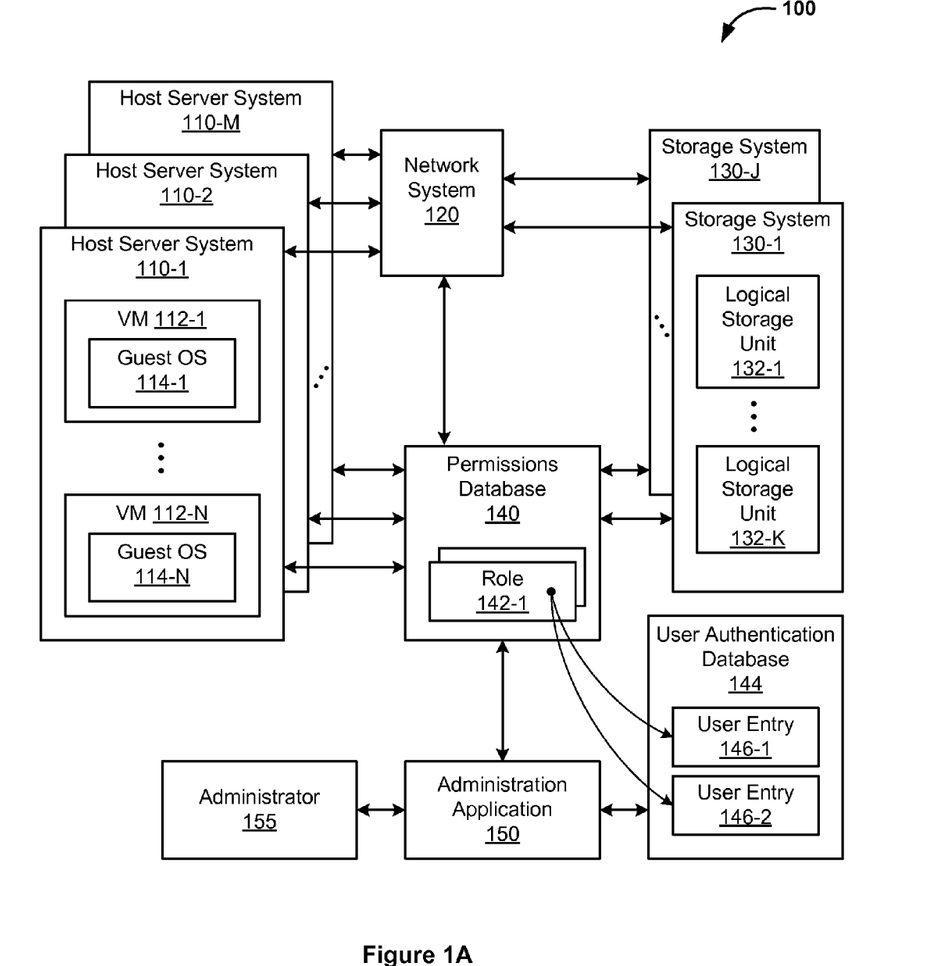
FIG. 1A is a block diagram of an exemplary computing system configured to implement one or more embodiments of the present invention.

FIG. 1A is a block diagram of an exemplary computing system configured to implement one or more embodiments of the present invention. Computing system 100 comprises host server systems 110, a network system 120, and storage systems 130. Each host server system 110 may be built on an underlying hardware computing platform comprising one or more computer systems, including systems based on different variations of the well-known x86 architecture platforms. Each host server system 110 may include one or more virtual machines (VMs) 112 that are each configured to execute a corresponding guest operating system (OS) 114.

Each storage system 130 may comprise one or more underlying storage media devices such as magnetic hard disk drives, solid-state drives, or any suitable mass storage media devices. A given storage system 130 may be configured to present a block-based unit of storage, exposed as a logical storage unit 132 within a given storage unit 130, such as a logical unit number (LUN). Each logical storage unit 132 is generated from underlying physical storage, such as magnetic or solid state storage media. In certain configurations, a networked file system may be mounted to one or more of the VMs 112. Network system 120 couples host server systems 110 and storage systems 130 together, enabling each system to communicate with other systems. Network system 120 may implement Ethernet, Fibre Channel, or any other technically feasible data networking technology. Network system 120 may implement switching, routing, or any combination thereof, and may comprise one or more physically distinct devices.

Each computer system 110, network system 120, and storage system 130 may be represented as an object having a specific set of available actions. A given action may be executed in response to a request from a particular user, provided the user has been granted an appropriate permission for the action. A permissions database 140 is configured to store permissions information for each object within computing system 100. Permissions database 140 may be configured to store at least one role 142, which comprises a list of permissions for an arbitrary collection of objects within computing system 100. Exemplary distinct permissions may include, without limitation, permission to create a VM within a specific host server system 110, permission to turn on or off a specific VM, permission to turn on or off any VM within a specific host server system 110, permission to create a logical storage unit 132 within a specific storage system 130, permission to associate a logical storage unit 132 with a specified VM, and so forth.

An administration application 150 is a special application that executes with all available permissions for each object within computing system 100. Administration application 150 therefore has permission to add one or more permissions to role 142 and edit a user authentication database 144, which maintains a list of user accounts that are given various forms of access to computing system 100. Each user account is defined by a user entry 146, which includes information about the user and a list of certain permissions granted to the user. Each user entry 146 may be associated with a certain role 142, which may define additional permissions for user entry 146. An administrator 155 is an individual with access to execute administration application 150, thereby gaining full access to each available action for each object within computing system 100. In certain scenarios, administrator 155 may delegate to a specified user certain administrative tasks, such as creating, configuring, and operating a VM 122. In such a scenario, administrator 155 may use administration application 150 to configure a certain role 142 to include all necessary permissions to perform the administrative tasks and associate the role with the user account by associating the role with a corresponding user entry 146. Administration application 150 may execute on any appropriate computing resource within computing system 100.

In certain scenarios, a particular administrative task may involve a long, complex, and interrelated sequence of commands having a complex set of required permissions to complete. For example, a user may need to create a VM, mount an installation image for a guest OS onto a host from a remote storage system for installation on the VM, and connect the VM to a remote logical storage unit onto which installation data for the guest OS is stored. Such an administrative task involves a number of different objects within computing system 100, and each object may require one or more permissions to complete the administrative task. A particular user should not be given more permissions than necessary to perform their delegated tasks. For example, while the user is given permission to create the VM and perform related actions to configure the VM within the computing system 100, the same user may not necessarily need permission to migrate the VM to a different host within the computing system 100. In one usage model, VMware's vCenter Orchestrator (VCO) is used to establish a workflow comprising commands for accomplishing the administrative task.

It should be recognized that commands may require a single or plural permissions to properly execute. For example, the conventional block-attach command for attaching a logical storage unit to a VM may require permission to execute the command on the host and, separately, permission to access the logical storage unit, which may be specified as an input parameter to the command. In general, a given command requires at least execute permission, and objects upon which the command operates typically require an additional permission or permissions. Certain objects may require a finer level of permission detail than simply whether access is permitted. For example, the logical storage unit typically requires separate permissions for reading and writing data. A read-only logical storage unit may be used as an installation image that should never be written by a user, while a read-write logical storage unit may be used for storing user data that is generated and written by the user.

Once a user is associated with a role that includes an appropriate list of permissions, the user may perform any action allowed by the list of permissions. Permissions may be added explicitly or implicitly based on the method defined below in FIG. 3. A permissions system implemented by objects within the computing system 100 is required to honor all permissions granted to a user when the user is associated with a role. Any technically feasible permissions system may be implemented without departing the scope and spirit of the present invention. The permissions system may comprise one or more permissions subsystems, such as certain features of VMware's Service Console product, a pluggable authentication module (PAM) within Service Console, and Active Directory.

Figure 1B:
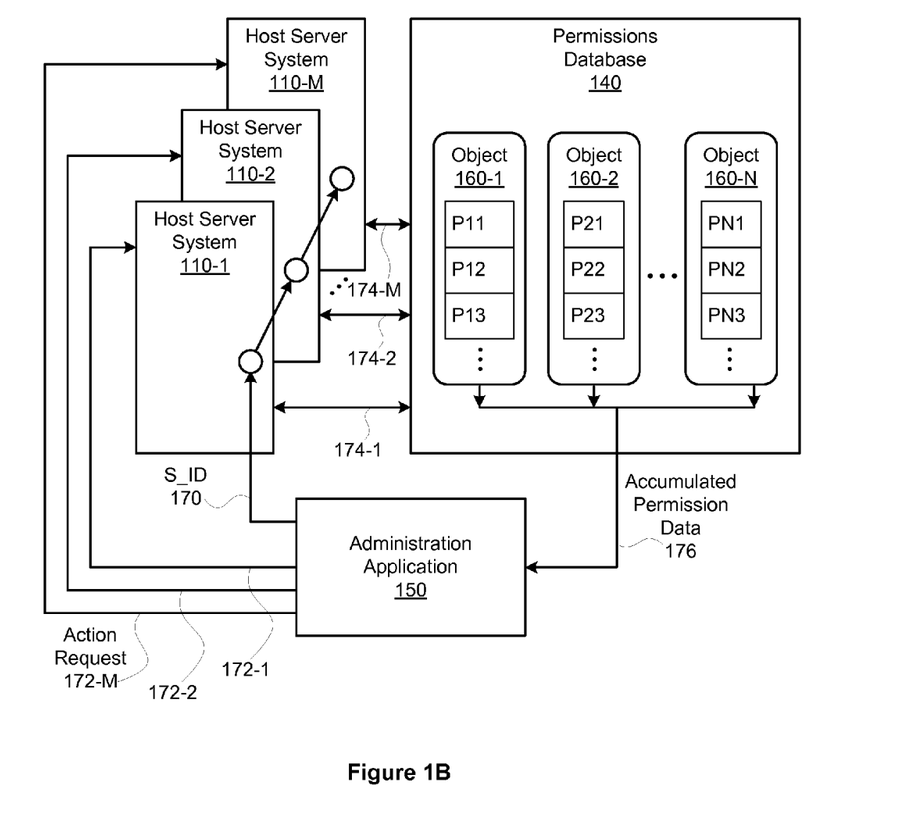
FIG. 1B illustrates the computing system of FIG. 1A configured to execute action requests based on specific permissions stored in a permissions database, according to one embodiment of the present invention.

FIG. 1B illustrates the computing system of FIG. 1A configured to execute action requests based on specific permissions stored in permissions database, according to one embodiment of the present invention. Administration application 150 is further configured to perform certain administrative tasks, each comprising one or more commands, where each command may include one or more specific actions performed by host server systems 110. Administration application 150 also generates a unique session identifier (S_ID) 170 to which related actions may be associated, and transmits S_ID 170 to host server systems 110 for later reference in the context of processing action requests 172.

In an exemplary usage model, administration application 150 performs a given command by transmitting one or more action requests 172, each tagged with S_ID 170, to host server systems 110 for execution. Each of the action requests may require an associated user to have permission, such as a specific execution or access privilege, to execute a corresponding action on a specified host server system. A given action may involve calling an application programming interface (API) within a software subsystem executing on host server system 110. The instructions of such API transmits a permission query 174 to permissions database 140 to determine whether the associated user has permission P to perform the action. In one embodiment, permission query 174 includes a reference to the associated user, S_ID 170, and a specific permission P associated with a proposed action to be performed. For example, host server system 110-1 receives action request 172-1, with an associated user and S_ID 170, to perform an action which requires permission P23, associated with object 160-2. To determine whether the associated user has permission to perform the action, host server system 110-1 transmits permission query 174, comprising the associated user, S_ID 170, and an identifier for permission (e.g., P23), to permissions database 140. Permissions database 140 records that a query was posted to permission P23 for S_ID 170, and returns any appropriate query results to host server system 110-1. It should recognized that, after administration application 150 has completed requesting all actions for a given recording session, permissions database 140 then has an accumulated record of all dynamically generated permission queries associated with S_ID 170. This accumulated record is transmitted from permissions database 140 to administrative application 150 as accumulated permission data 176.

This usage model for recording permission contemplates certain dynamic relationships between overall system state and actions. For example, if an action requests that host server systems stop all VMs with high memory usage, administration application 150 may call an API such as "StopAllVMsWithHighMemoryUsage (% usage)" to test each active VM for memory usage before determining whether the VM needs to be stopped. In the process of executing the "StopAllVMsWithHighMemoryUsage (% usage)" API call, a plurality of actions may be performed, according to the prevailing system state. Each such action that requires a permission results in a permission query 174 being generated by a corresponding host server system. The permission query 174 is tagged with an appropriate S_ID 170, which is recorded by permissions database 140 against a target permission being queried. The set of permissions having a specific S_ID recorded comprise the accumulated permission data 176, which is transmitted to administration application 150. Because each S_ID is unique to a particular user session and all permissions data is accumulated in association with a specific S_ID, multiple users may simultaneously record sessions without interfering with one another.

Figure 2:
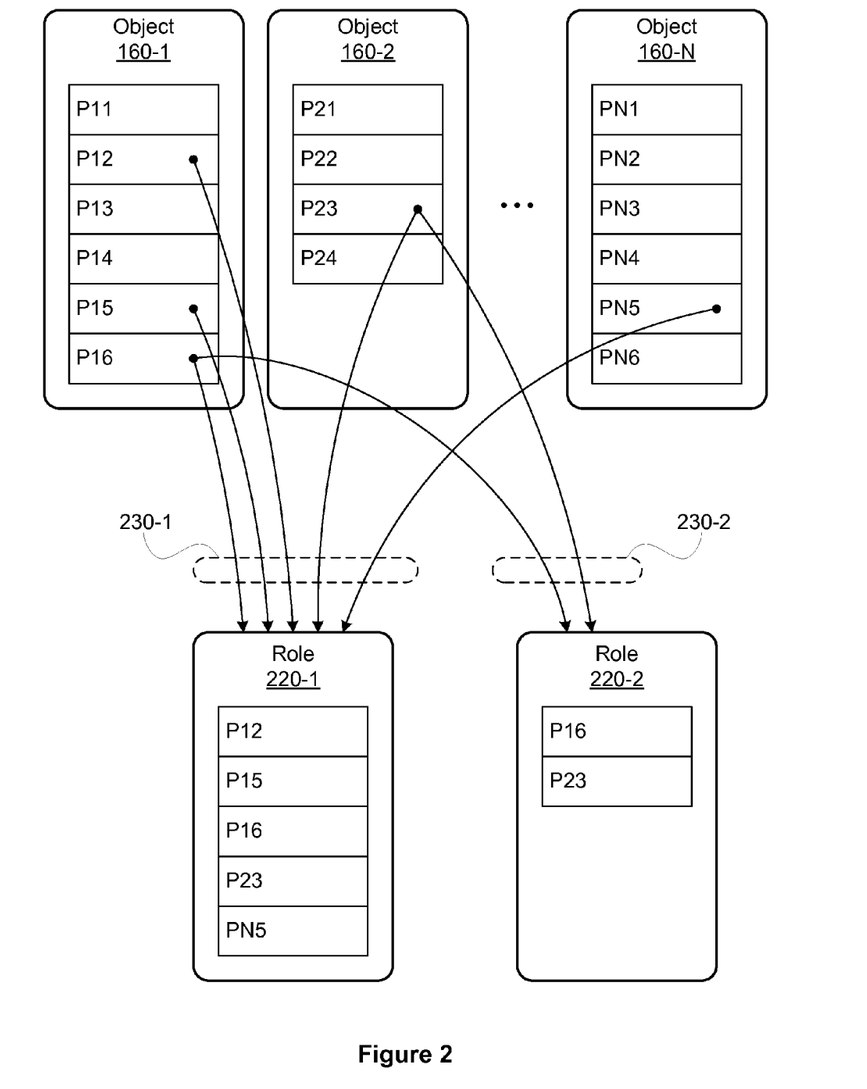
FIG. 2 illustrates associations between permissions and roles, according to an embodiment of the present invention.

FIG. 2 illustrates associations between permissions and roles, according to an embodiment of the present invention. As shown, object 160-1 includes permissions P11 through P16, object 160-2 includes permissions P21 through P24, and object 160-N includes permissions PN1 through PN6. Each object 160 corresponds to a specific system element, such as host server system 110-1 or storage system 130-1, within the computing system 100 of FIG. 1A, and each permission (P) within object 160 corresponds to a specific corresponding system permission, such as permission to create a VM, power on or off a VM, migrate a VM or virtual disks of the VM, clone a VM, or snapshot a VM. In this example, role 220-1 includes a permissions set 230-1, comprising permissions P12, P15, P16, P23, and PN5. Additionally, role 220-2 includes a permissions set 230-2, comprising permissions P16 and P23. Role 220-1 may be associated with one or more users who need to perform actions associated with permissions P12, P15, P16, P23, and PN5. Similarly, Role 220-2 may be associated with one or more users who need to perform actions associated with permissions P16 and P23. While each role is shown having specific permissions, any given role may have an arbitrary list of permissions and may be associated with an arbitrary collection of users.

Figure 3:
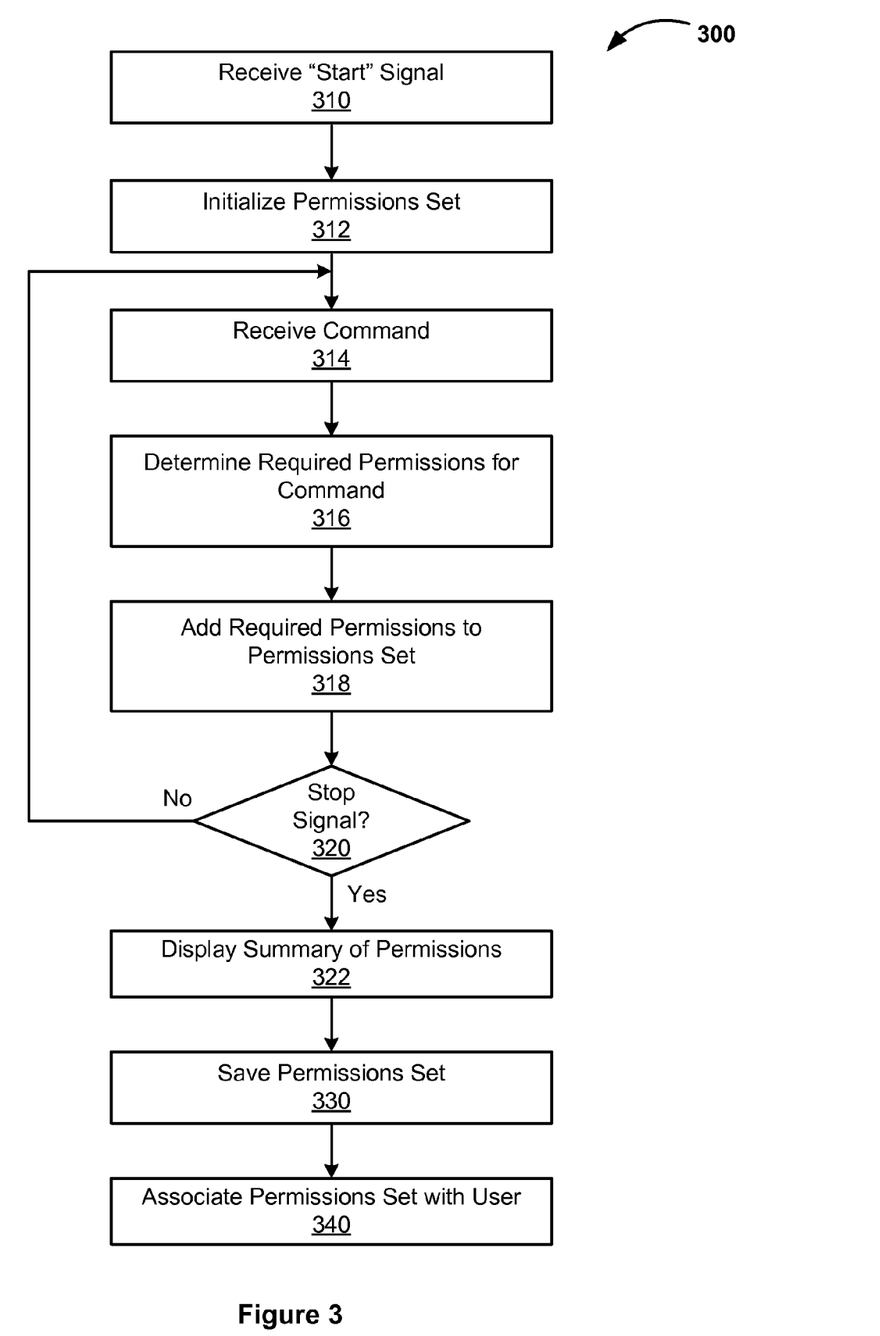
FIG. 3 is a flow diagram of method steps, performed by an administration application, for determining which permissions are required to perform a sequence of one or more commands, according to an embodiment of the present invention.

FIG. 3 is a flow diagram of method 300, performed by administration application 150, for determining which permissions are required to perform a sequence of one or more commands, according to an embodiment of the present invention. Although the method steps are described in conjunction with the system of FIG. 1A, it should be understood that there are other systems in which the method steps may be carried out without departing the scope and spirit of the present invention.

Method 300 begins in step 310, where administration application 150 receives a start signal. The start signal may be generated in response to administrator 150 pressing a "record" button on a graphical user interface (GUI) presented by administration application 150. Administration application 150 may generate the GUI locally or as a web page viewed by administrator 155 via a web browser on a remote computer. In step 312, administration application 150 initializes a permissions set to include a null list of permissions. The permissions set may be represented using any data structure capable of storing a list of arbitrary permissions. In step 314, administration application 150 receives a command from administrator 155. In one usage model, the command is associated with a target object, such as a specific VM, and an action to be performed by the target object in connection with an administrative task. For example, the administrative task may be to turn on the VM, and the command represents a means for a user to specify the task to administration application 150. The command may be conveyed to administration application 150 via a command line, a configuration file, a web API, the GUI, or any other technically feasible technique. When recording a command, administration application 150 may determine which permissions are necessary to execute the command without necessarily executing the command.

In step 316, administration application 150 determines a set of required permissions to execute the command, which directly specifies an action that can be performed by the target object. In one embodiment, each object (e.g., the target object) maintains and exposes to administration application 150 a specific, static set of permissions for each possible action that can be performed. Administration application 150 queries the target object to determine the set of required permissions for the action associated with the command. No actions are actually performed, but instead the set of required permissions is returned. In an alternative embodiment, a specific, static set of permissions for each possible action to be performed by an object is maintained in a central database. When an object is added to computing system 100, the central database is updated to include a set of permissions for the object. Administration application 150 determines the set of required permissions for the command by querying the central database. In another alternative embodiment, each object is configured to execute the command in a query mode, whereby the set of required permissions is dynamically determined at the time each command is performed. In certain scenarios, such as where execution paths need to be computed dynamically in conjunction with command execution, the set of required permissions may need to be determined dynamically. A software development kit (SDK) may be configured to provide a standard mechanism for exposing permissions via a static query mechanism, a dynamic query mechanism, or any combination thereof.

In step 318, administration application 150 adds the set of required permissions to the permissions set. In one embodiment, each unique, required permission that is not yet represented in the permissions set is added to the permissions set. The permissions set may include, without limitation, a list of targeted objects, actions requiring permission, specific permissions, and so forth. If, in step 320, a stop signal is received, then method 300 proceeds to step 322. The stop signal may be generated in response to administrator 150 pressing a "stop" button on the GUI. Between pressing the record button and the stop button on the GUI, administrator 155 is able to enter the command, and additional commands, as required by specific administrative tasks to be performed on objects in computing system 100. In one embodiment, administrator 155 is able to save a current snapshot of the permissions set prior to entering a stop signal. For example, if administrator 155 is configuring two roles, with a first role having fewer permissions than a second role, then a current snapshot may be taken for the first role prior to completing a recording session for the second role.

In step 322, administration application 150 may display a summary of permissions added to the permissions set between the start signal and the stop signal. The summary of permissions corresponds to the permissions set. The summary of permissions may also list which objects were targeted by commands recorded between the start signal and the stop signal. In step 330, administration application 150 saves the permissions set. In a scenario where no superfluous commands are recorded beyond those needed to perform a given administrative task, the permissions set represents a minimal permissions set for a corresponding administrative task or tasks. In one embodiment, administration application 150 saves the permissions set to permissions database 140 as a specific role, which may comprise a newly defined role having a newly created role identifier. The role may be represented as a role entry 142. In another embodiment, the permissions set is saved by adding the permissions set to at least one role identifier, such as a role name, associated with a corresponding role entry 142 stored in permissions database 140, according to method 400, described below. In yet another embodiment, the permissions set is saved by adding the permissions set to a proxy task object, which may be later executed using the permissions set.

Method 300 terminates in step 340, where administration application 150 associates the permissions set with a user. In one embodiment, the permissions set is associated with the user by associating the user with a role corresponding to the permissions set. One implementation of this embodiment is illustrated in greater detail in FIG. 4. In another embodiment, the permissions set is associated with the user by granting each permission within the permissions set to the user. In yet another embodiment, the permission set is associated with the user indirectly by granting the user permission to execute a proxy task object having previously been assigned the permissions set.

Returning to step 320, if a stop signal is not received, then method 300 proceeds back to step 314.

During operation, administrator 155 may press the record button on the GUI and then enter a set of commands corresponding to one or more administrative tasks to be delegated to a user. After entering the last command in the set of commands, administrator 155 presses the stop button on the GUI. At this point the permissions set includes all necessary permissions for the user to be able to perform the one or more delegated administrative tasks. The permissions set may be saved as a specified role and subsequently associated with the user, thereby enabling the user to be able to properly execute the set of commands.

Figure 4:
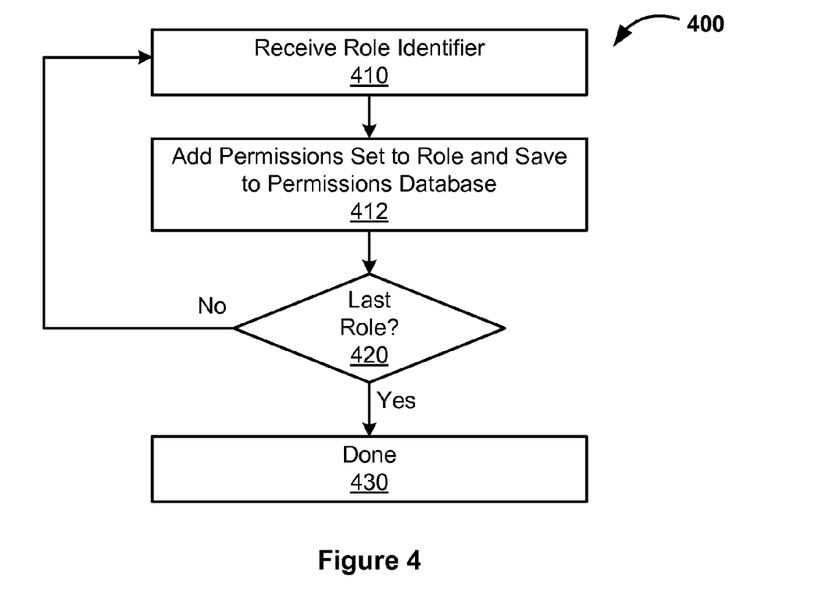
FIG. 4 is a flow diagram of method steps, performed by an administration application, for adding permissions to roles, according to an embodiment of the present invention.

FIG. 4 is a flow diagram of method 400, performed by administration application 150, for adding permissions to roles, according to an embodiment of the present invention. Although the method steps are described in conjunction with the system of FIG. 1A, it should be understood that there are other systems in which the method steps may be carried out without departing the scope and spirit of the present invention. In one embodiment, method 400 corresponds to step 340 in FIG. 3, above.

Method 400 begins in step 410, where administration application 150 receives a role identifier from administrator 155. The role identifier specifies a role 142 of FIG. 1A. In one embodiment, the role identifier is received via the GUI. The GUI may be configured to reference existing roles 142 or generate new roles 142, based on instructions from administrator 155. In step 412, administration application 150 adds the permissions set, determined in method 300, to the specified role and saves the resulting list of permissions for the specified role to database 140. If, in step 420 the specified role is not the last role to be specified by administrator 155, then method 400 proceeds back to step 410. Otherwise, method 400 terminates in step 430.

Figure 5:
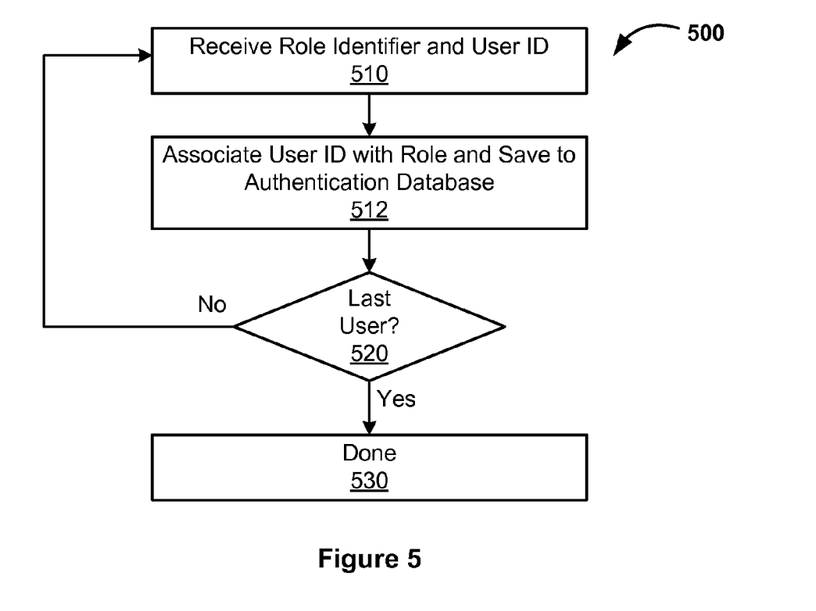
FIG. 5 is a flow diagram of method steps, performed by an administration application, for associating a role with a user, according to an embodiment of the present invention.

FIG. 5 is a flow diagram of method 500, performed by administration application 150, for associating a role with a user, according to an embodiment of the present invention. Although the method steps are described in conjunction with the system of FIG. 1A, it should be understood that there are other systems in which the method steps may be carried out without departing the scope and spirit of the present invention. In one usage model, method 500 is performed by administrative application 150 to associate a predefined role with one or more existing users, thereby enabling the existing users to perform corresponding administrative tasks.

Method 500 begins in step 510, where administration application 150 receives a role identifier and a user identifier (ID) from administrator 155. In one embodiment, the role identifier specifies a role 142 of FIG. 1A. The user identifier specifies a user entry 146 in user authentication database 144. The role identifier and the user identifier may be received via the GUI. The GUI may be configured to reference existing roles 142 or generate new roles 142, and to reference existing user entries 146 or generate new user entries 146, based on instructions from administrator 155. In step 512, administration application 150 associates the user entry 146 specified by the user identifier with the role 142 specified by the role identifier and saves a resulting user entry 146 to user authentication database 144. If, in step 520, the specified user entry is not the last user entry, then method 500 proceeds back to step 510. Otherwise, method 500 terminates in step 530.

Figure 6:
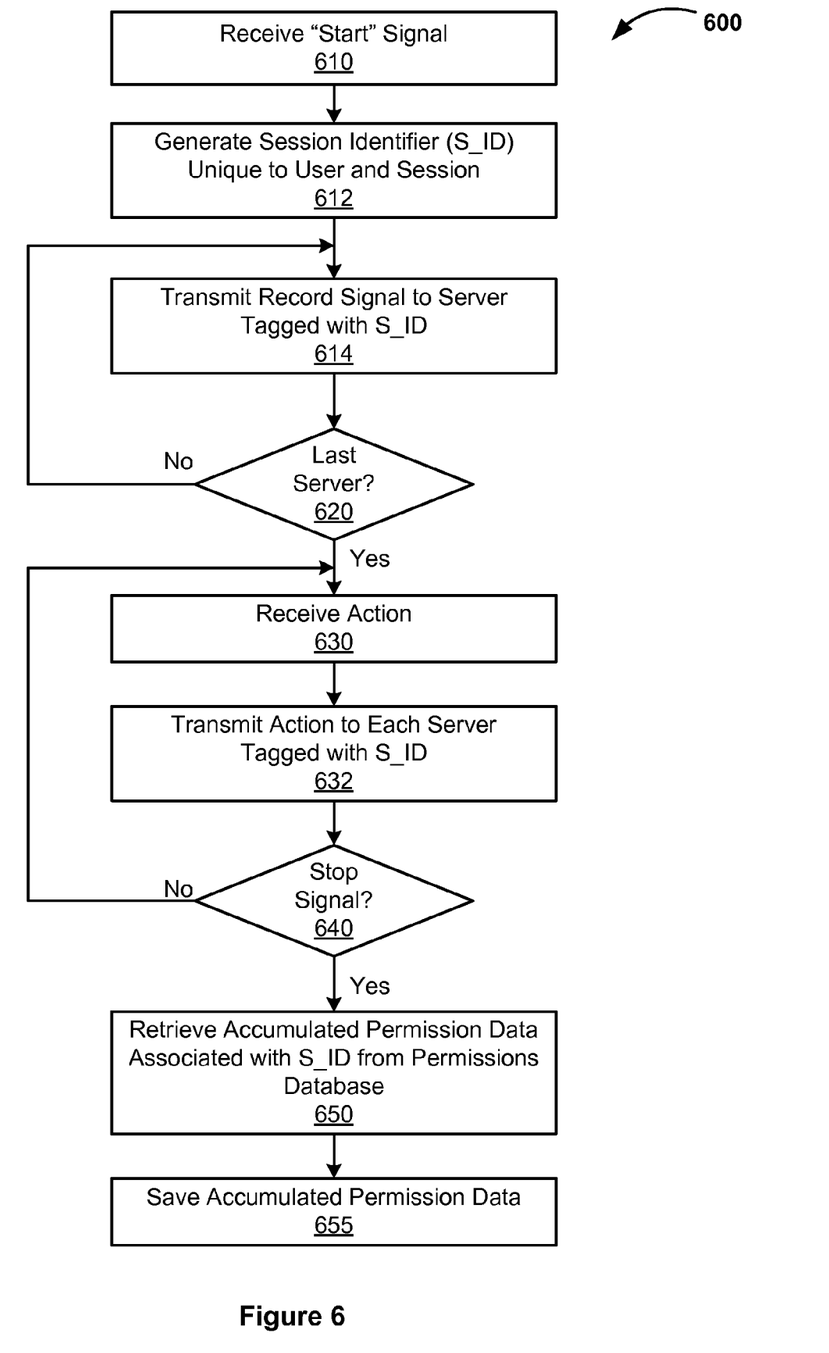
FIG. 6 is a flow diagram of method steps, performed by an administrative application, for dynamically determining which permissions are required to perform a sequence of one or more actions, according to an embodiment of the present invention.

FIG. 6 is a flow diagram of method 600, performed by administration application 150, for dynamically determining which permissions are required to perform a sequence of one or more actions, according to an embodiment of the present invention. Although the method steps are described in conjunction with the system of FIGS. 1A and 1B, it should be understood that there are other systems in which the method steps may be carried out without departing the scope and spirit of the present invention.

Method 600 begins in step 610, where administration application 150 receives a start signal to indicate recording should start for a session comprising administrative actions. The start signal may be received via a GUI presented by administration application 150, a command line presented by administration application 150, or a file read into administration application 150. In step 612, administration application 150 generates a new session identifier (S_ID), such as S_ID 170, which is unique to a particular user and session. In step 614, administration application 150 transmits a record signal, tagged with the S_ID, to a host server system. If, in step 620, the host server system is determined to be the last host server system needed for a recording session associated with S_ID, then the method proceeds to step 630. Otherwise, administration application 150 repeats steps 614 and 620 for another host server system.

In step 630, administration application 150 receives an action to be performed by a host server system. The action may be received via a GUI presented by administration application 150, a command line presented by administration application 150, or a file read into administration application 150. The action comprises at least one task, such as an administrative task, to be recorded as part of the recording session. In step 632, administration application 150 transmits the action, tagged with S_ID, to each host server system needed for execution of the action. Steps 630 and 632 continue to be executed for all actions performed on the host server systems until a stop signal is received by administration application 150 in step 640.

If, in step 640, administration application 150 receives a stop signal indicating that the recording sessions should be halted, then the method proceeds to step 650. The stop signal may be received via a GUI presented by administration application 150, a command line presented by administration application 150, or a file read into administration application 150. In step 650, administration application 150 retrieves from permissions database 140 accumulated permission data associated with S_ID, such as accumulated permission data 176 of FIG. 1B. In step 655, the administration application 150 saves the accumulated permission data. It should be recognized that accumulated permission data saved in this manner may be associated with one or more users, or one or more roles.

In certain alternative embodiments, step 614 is performed only after an action is received in step 630, and only host server systems required by the action are notified with the new generated S_ID. In certain other alternative embodiments, administration application 150 is configured to interact with a top hierarchical rank of host sever systems 110. In such embodiments, each host server system 110 may have one or more levels of host server systems organized in an underlying hierarchy. Each host server system 110 may act as a delegated administration application to other host server systems within the underlying hierarchy. Multiple layers of host server systems may be configured to act in an administrative capacity to underlying host server systems. Consolidated results of administrative actions are reported back up each hierarchy to a top-level host server system, which may report the results back to administration application 150. Hierarchical permissions may be enforced via a software design kit API set associated with each host server system 110.

In sum, a technique for determining which permissions are required for executing management tasks within a computing system is disclosed. An administrator starts recording a sequence of commands that define one or more administrative tasks and stops recording after entering the last such command. In certain scenarios, the commands need not be executed for the purpose of recording permissions. Each command has an associated set of permissions needed to actually execute the command. Each set of permissions is added to a permissions set, which is applied to a role. When the role is associated with a user, the user is granted all necessary permissions to properly execute the commands.

One advantage of the present invention is that an administrator is able to delegate specified administrative tasks to a user without conventional trial and error inefficiencies associated with determining a complete set of permissions required to perform the administrative tasks.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. In a computing system having a plurality of managed objects where a user is required to have permission to perform an administrative task on an object, a method for setting permissions required to perform a specified administrative task, said method comprising:
    receiving, at an administrative application of said computing system, a command corresponding to an administrative task to be operated on at least one managed object within the computing system;
    determining a set of permissions required to perform the command, by said administrative application, in response to receiving the command, wherein said determining comprises receiving said set of permissions from said at least one managed object in response to a query from said administrative application;
    saving the set of required permissions to a role that can be associated with any user to enable the user to perform the administrative task at a later time, by said administrative application; and
    associating the saved set of required permissions with the role.

2. The method of claim 1, further comprising:
    receiving a start signal for initiating a recording of the permissions required to perform the administrative task;
    receiving a stop signal for stopping the recording; and
    displaying the permissions that have been recorded.

3. The method of claim 2, further comprising:
    generating an identifier to be associated with the permissions recorded between the start signal and the stop signal,
    wherein the set of permissions is saved to the role together with the identifier.

4. The method of claim 1, wherein said saving the set of required permissions comprises:
    receiving a role identifier that identifies one role within a permissions database;
    adding the set of required permissions to a permissions list associated with the one role; and
    saving the permissions list to the permissions database.

5. The method of claim 4, further comprising:
    receiving the role identifier and a user identifier that identifies one user within an authentication database;
    associating the one user with the one role; and
    saving the association to the authentication database.

6. The method of claim 5, wherein the role identifier and the user identifier are received via a graphical user interface (GUI).

7. The method of claim 5, wherein the set of permissions comprises a static list of permissions corresponding to the command.

8. The method of claim 5, wherein the set of permissions comprises a dynamically generated list of permissions corresponding to the command.

9. The method of claim 1, wherein the at least one managed object comprises a virtual machine instantiated in the computing system.

10. The method of claim 9, wherein the administrative task includes one of powering on the virtual machine, powering off the virtual machine, migrating the virtual machine, cloning the virtual machine, and creating a snapshot of the virtual machine.

11. In a computing system having a plurality of managed objects where a user is required to have permission to perform an administrative task on an object, a method for setting permissions required to perform a specified administrative task, said method comprising:
    receiving, at an administrative application of said computing system, a start signal for initiating a recording of the permissions required to perform an administrative task to be operated on at least one managed object within the computing system;
    determining a set of permissions required to perform the administrative task, by said administrative application, in response to receiving the start signal, wherein said determining comprises receiving said set of permissions from said at least one managed object in response to a query from said administrative application;
    receiving a stop signal for stopping the recording;
    accessing the set of required permissions that have been determined between initiation and stopping of the recording; and
    associating the set of required permissions with a user to enable the user to perform the administrative task at a later time.

12. The method of claim 11, wherein the administrative task includes a sequence of commands.

13. The method of claim 11, wherein the at least one managed object comprises a virtual machine instantiated in the computing system.

14. The method of claim 12, wherein the administrative task includes one of powering on the virtual machine, powering off the virtual machine, migrating the virtual machine, cloning the virtual machine, and creating a snapshot of the virtual machine.

15. A virtualized computing system comprising:
one or more physical machines in which a plurality of virtual machines are instantiated; and
an administration application of said virtualized computing system that is programmed to execute administrative tasks on the virtual machines in response to user inputs and to set permissions required to perform the administrative tasks by carrying out the steps of receiving one or more commands corresponding to a specific administrative task to be operated on a virtual machine, determining a set of permissions required to perform the commands, wherein said determining comprises receiving said set of permissions from said virtual machine in response to a query from said administrative application, and associating the set of required permissions with a user to enable the user to perform the specific administrative task.

16. The system of claim 15, wherein the specific administrative task includes one of powering on the virtual machine, powering off the virtual machine, migrating the virtual machine, cloning the virtual machine, and creating a snapshot of the virtual machine.

\* \* \* \* \*